United States Patent
Ho et al.

(10) Patent No.: US 10,623,681 B2
(45) Date of Patent: **\*Apr. 14, 2020**

(54) SYSTEM AND METHOD FOR PRESENTING MULTIPLE PICTURES ON A TELEVISION

(71) Applicant: InnoBrilliance, LLC, Dripping Springs, TX (US)

(72) Inventors: Chi Fai Ho, Palo Alto, CA (US); Shin Cheung Simon Chiu, Palo Alto, CA (US)

(73) Assignee: INNOBRILLIANCE, LLC, Dripping Springs, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/728,451

(22) Filed: Oct. 9, 2017

(65) Prior Publication Data
US 2018/0084214 A1   Mar. 22, 2018

Related U.S. Application Data

(63) Continuation of application No. 15/065,960, filed on Mar. 10, 2016, now Pat. No. 10,148,902, which is a
(Continued)

(51) Int. Cl.
*G06F 3/00* (2006.01)
*G06F 13/00* (2006.01)
(Continued)

(52) U.S. Cl.
CPC .......... *H04N 5/44591* (2013.01); *H04N 5/45* (2013.01); *H04N 7/0122* (2013.01);
(Continued)

(58) Field of Classification Search
CPC ........... H04N 5/44591; H04N 21/4363; H04N 21/4622; H04N 21/4383; H04N 21/439; H04N 21/4316; H04N 21/4263; H04N 21/440272; H04N 21/4438; H04N 21/43637; H04N 21/43635; H04N 21/43632; H04N 5/45; H04N 7/0122; G06F 3/044; G06F 3/0414; G06F 3/0416;
(Continued)

(56) References Cited

U.S. PATENT DOCUMENTS

| 6,097,383 A | 8/2000 | Gaughan et al. |
| 6,363,204 B1 * | 3/2002 | Johnson ................. G11B 19/02 348/552 |

(Continued)

*Primary Examiner* — Pankaj Kumar
*Assistant Examiner* — Alazar Tilahun (57) ABSTRACT

A device provides multiple video streams from a plurality of video streams to a display. The device includes an input interface, a frame controller, and an output interface. The input interface is configured to receive a plurality of video streams and to transfer the plurality of video streams to the frame controller. The frame controller is configured to generate frame signals including multiple subframe signals corresponding to a video stream of the plurality of video streams. The output interface is configured to output the frame signals to the display. The frame signals are configured to cause video from multiple video streams of the plurality of video streams to be displayed in separate non-overlapping portions on the display.

20 Claims, 7 Drawing Sheets

Related U.S. Application Data continuation of application No. 14/480,595, filed on Sep. 8, 2014, now Pat. No. 9,319,619, which is a continuation of application No. 11/731,461, filed on Apr. 2, 2007, now Pat. No. 8,863,187.

(51) Int. Cl.

| | | |
|---|---|---|
| *H04N 5/455* | (2006.01) | |
| *H04N 5/45* | (2011.01) | |
| *H04N 21/431* | (2011.01) | |
| *H04N 21/4363* | (2011.01) | |
| *H04N 21/4402* | (2011.01) | |
| *H04N 5/445* | (2011.01) | |
| *H04N 21/426* | (2011.01) | |
| *H04N 21/443* | (2011.01) | |
| *H04N 7/01* | (2006.01) | |
| *H04N 21/438* | (2011.01) | |
| *H04N 21/439* | (2011.01) | |
| *H04N 21/462* | (2011.01) | |

(52) U.S. Cl.
CPC ....... *H04N 21/4263* (2013.01); *H04N 21/439* (2013.01); *H04N 21/4316* (2013.01); *H04N 21/4363* (2013.01); *H04N 21/4383* (2013.01); *H04N 21/43632* (2013.01); *H04N 21/43635* (2013.01); *H04N 21/43637* (2013.01); *H04N 21/4438* (2013.01); *H04N 21/440272* (2013.01); *H04N 21/4622* (2013.01)

(58) Field of Classification Search
CPC ............. G06F 3/0412; G02F 1/133514; G02F 1/134336; G02F 1/13338

USPC .................................................. 725/38–61

See application file for complete search history.

(56) References Cited

U.S. PATENT DOCUMENTS

| | | | |
|---|---|---|---|
| 6,563,515 B1 * | 5/2003 | Reynolds | H04N 5/44543 348/E5.105 |
| 7,174,512 B2 * | 2/2007 | Martin | G06Q 30/02 348/E5.097 |
| 7,373,650 B1 * | 5/2008 | Rodriguez | H04N 5/44591 348/565 |
| 7,631,329 B1 | 12/2009 | Yamada | |
| 7,802,288 B2 | 9/2010 | Sie et al. | |
| 8,249,414 B2 | 8/2012 | Ackley et al. | |
| 8,863,187 B2 | 10/2014 | Ho et al. | |
| 8,925,010 B2 | 12/2014 | Ho et al. | |
| 9,247,299 B1 | 1/2016 | Ho et al. | |
| 9,319,619 B1 | 4/2016 | Ho et al. | |
| 10,148,902 B1 | 12/2018 | Ho et al. | |
| 2002/0013941 A1 | 1/2002 | Ward et al. | |
| 2002/0067376 A1 | 6/2002 | Martin et al. | |
| 2002/0180887 A1 | 12/2002 | Kim et al. | |
| 2003/0067558 A1 | 4/2003 | Shintani et al. | |
| 2003/0117430 A1 | 6/2003 | Reynolds et al. | |
| 2003/0229900 A1 | 12/2003 | Reisman | |
| 2004/0070593 A1 | 4/2004 | Neely et al. | |
| 2006/0098596 A1 | 5/2006 | Park et al. | |
| 2006/0282785 A1 * | 12/2006 | McCarthy | G06T 1/00 715/760 |
| 2007/0011702 A1 * | 1/2007 | Vaysman | H04N 21/84 725/45 |
| 2008/0066103 A1 | 3/2008 | Ellis et al. | |
| 2008/0111822 A1 | 5/2008 | Horowitz et al. | |
| 2010/0122294 A1 | 5/2010 | Craner | |

* cited by examiner

SYSTEM AND METHOD FOR PRESENTING MULTIPLE PICTURES ON A TELEVISION

CROSS-REFERENCE TO RELATED APPLICATIONS

The present application is a continuation of and claims priority to U.S. patent application Ser. No. 15/065,960, filed Mar. 10, 2016, which is a continuation of U.S. patent application Ser. No. 14/480,595, filed Sep. 8, 2014, now issued as U.S. Pat. No. 9,319,619, which is a continuation of U.S. patent application Ser. No. 11/731,461, filed Apr. 2, 2007, now issued as U.S. Pat. No. 8,863,187, the content of each of which is incorporated by reference herein in its entirety.

FIELD OF THE INVENTION

This invention generally relates to television, and more particularly, to a system and method to display multiple pictures on a television set.

BACKGROUND OF THE INVENTION

The introduction of High Definition Television (HDTV) and the flat panel display has led to new and pleasant experience in watching television. The slimness of a flat panel television set saves space and allows a consumer to place a larger television in a room of limited size. HDTV sets support high resolution and better picture quality. Many HDTV sets sold today are flat panel television sets.

Along with the improved resolution and picture quality, the trend in HDTV sales has been towards a general increase in the size of the average television display. For example, in United States, the average size of a HDTV set sold is now approximately 30 inches, diagonal. In some Asian countries, the average size is even larger than 32 inches.

A large screen allows a consumer to more comfortably view multiple pictures. For example, a consumer may watch the Super Bowl on a large picture on the display screen, while simultaneously viewing an NBA game between the Sacramento Kings and the LA Lakers on a smaller picture, a local college basketball between Stanford and Berkeley on a third picture, and a hockey game between New York Islanders and Anaheim Ducks on a fourth picture on the television display. Not to miss any important news, the consumer may view CNN or FOX on a fifth picture. Last but not least, they may also view a sixth picture, such as from a baby monitor their 8-month old baby's room, at the same time. On a traditional smaller television screen, having six picture frames displaying simultaneously on the screen would necessitate that at least some of the picture frames would be so small as to be difficult to view at an average or normal viewing distance. With the large screen, however, more the larger display area allows for more picture detail to be discerned at the same distance than with a smaller television screen.

Currently, there are several ways to view multiple pictures simultaneously on a television set. Picture in picture (PIP) allows two pictures to be shown on a television set at the same time, with a smaller picture displayed on top of, or overlaying, a larger picture. Since the smaller picture overlays the larger picture, the larger picture is not entirely visible. This is often extremely inconvenient, as the overlaid picture may cover a portion of the larger picture of interest to the viewer. For example, the overlaid portion might cover the end zone of a football game.

Moreover, conventional PIP often does not display the overlaid pictures in their intended resolution or aspect ratio.

Also, there are PC television cards that can generate and present for display thumb-nail size pictures of many channels, and allow a user to select a channel to view from the small pictures. These small pictures are intended for channel selection purposes. They are small and difficult to be watched over a long period of time. Moreover, the PC television card can only tune to one channel at a time, thus the television channels are scanned one at a time to refresh the pictures. Due to limited processing speed, not all images and sounds of a given television channel are captured by the PC television card. The scanning and tuning speed may be so slow such that the pictures are effectively displayed as still images, or at best in a slow motion manner.

When going from a relatively small conventional television display to a larger and flatter display having improved resolution, consumers expect a major change in their enjoyment of the television viewing experience, especially after they have invested in a good quality large screen HDTV set.

Thus, there is a need to display multiple pictures on a high resolution large screen television set without overlaying another picture, while preserving the high resolution of the displayed pictures.

BRIEF SUMMARY OF THE INVENTION

An aspect of the present invention provides a television system including an input interface for receiving video data from a plurality of video streams and transferring the video data to a frame controller in communication with a television display. Each of the plurality of video streams has a display aspect ratio, and the frame controller causes the video data from each of the plurality of different video streams to be displayed in a separate frame on the television display. Each frame occupies an area of the television display separate from an area occupied by any other frame.

In another aspect of the invention, the input interface receives video data from one or more sources selected from the list including broadcast television, cable television, satellite television, video cassette player (VCR), and digital versatile disk (DVD).

In one aspect of the invention, the input interface receives video data in one or more of the following formats: NTSC, PAL, and HDTV.

In another aspect of the invention, the input interface includes one or more of a coaxial interface, a radio frequency (RF) interface, a high-definition multimedia interface (HDMI), component interface, composite interface, an Ethernet interface, or a wireless network interface.

In one aspect of the invention, the input interface includes a wireless network. Any wireless network may be used, including a Wireless Local Area Network (WLAN), a Worldwide Interoperability for Microwave Access (WiMax) network, or and Ultra-wideband (UWB) network.

In another aspect of the invention, the frame controller includes a plurality of tuners, each configured to generate a sub-frame signal from the video data from one of the video streams, with each sub-frame signal corresponding to one of the separate display frames. The frame controller is further configured to combine the sub-frame signals into a frame signal for display on the television display.

Another aspect of the invention also includes a control device for communicating instructions to the frame controller. The communicated instructions include what video streams are to be displayed in which frames.

In another aspect of the invention, the frame controller communicates with the control device by infrared signals, radio signals, or a data network. If a data network is used, it may be any of Ethernet, WLAN, WiMAX, or any other data network.

In another aspect of the invention, the control device is a remote control, a cell phone, a personal computer or a laptop computer.

Another aspect of the present invention provides a method for of displaying video from a plurality of video streams on a television display. The method includes inputting video data from the plurality of video streams to a frame controller, each video stream having a display aspect ratio, causing the video data from each of the plurality of video streams to be displayed in a separate frame on the television display. Each display frame occupies an area of the television display separate from the area occupied by any other frame.

Another aspect of the present invention provides a television system including an input interface for receiving high definition television (HDTV) video data from a plurality of video streams and transferring the HDTV video data to a frame controller in communication with a television display. Each of the plurality of video streams has a display aspect ratio, and the frame controller causes the HDTV video data from each of the plurality of different video streams to be displayed in high resolution a separate frame on the television display. At least one of the video streams is displayed in a frame having a height and a width in proportion to the video stream's aspect ratio. Furthermore, each frame further occupies an area of the television display separate from an area occupied by any other frame

DETAILED DESCRIPTION OF THE INVENTION

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

The term "video data" referred to in the descriptions of various embodiments of the invention herein described is intended to generally describe electronic audio and video signals containing or incorporating video for display on a television or other video display device. This term is used in the broadest sense as known in the electronic arts, and may include analog and/or digital signals. Likewise, the term "video stream" is used in a non-limiting fashion and generally refers to the collection of video data, together with any carrier signals, data headers or other electronic information, which singularly or taken together allow the described embodiments to operate. For example, a digital video stream from a given video source might include multiple packets of compressed video data, each packet or group thereof having one or more packet headers. Typically, one or more of the headers includes information relating to the video data, such as the compression algorithm used, the aspect ratio, etc.

The term "aspect ratio" referred to in the descriptions of the various embodiments of the invention herein described refers to the ratio of the width of the video display image to the height of the video display image. For most NTSC television display images, the current aspect ratio is 4:3. High-definition Television (HDTV) uses an aspect ratio of 16:9, which is similar to the aspect ratio used by motion pictures. Reference herein to displaying a video stream in a frame having a height and a width proportional to the video stream's aspect ratio means that an HDTV video stream is displayed filling a frame having a width:height ratio of 16:9. Similarly, a standard NTSC television video stream would be displayed filling a frame having a width:height ration of 4:3.

As used herein, the terms "picture frame" and "frame" refer to the borders of a displayed picture. Unless otherwise specified, a picture frame does not necessarily have a border of any particular width, i.e., a displayed picture might occupy the entire area of the picture frame, or the picture frame may include a border. Reference to locations on a display device may be made by referring to either the location of the picture frame or to the location of displayed picture itself, without limitation. Reference to the size of a picture frame refers to the height and width of the frame, and frames of differing width and/or differing height are referred to as being of different sizes.

As used herein, the term "picture" refers to the whole of the display image and its picture frame, unless otherwise indicated, without limitation.

An embodiment of the present invention advantageously provides for the display of multiple pictures on a high resolution large screen television set without overlaying another picture, while preserving the high resolution and aspect ratio of the displayed pictures.

Figure 1:
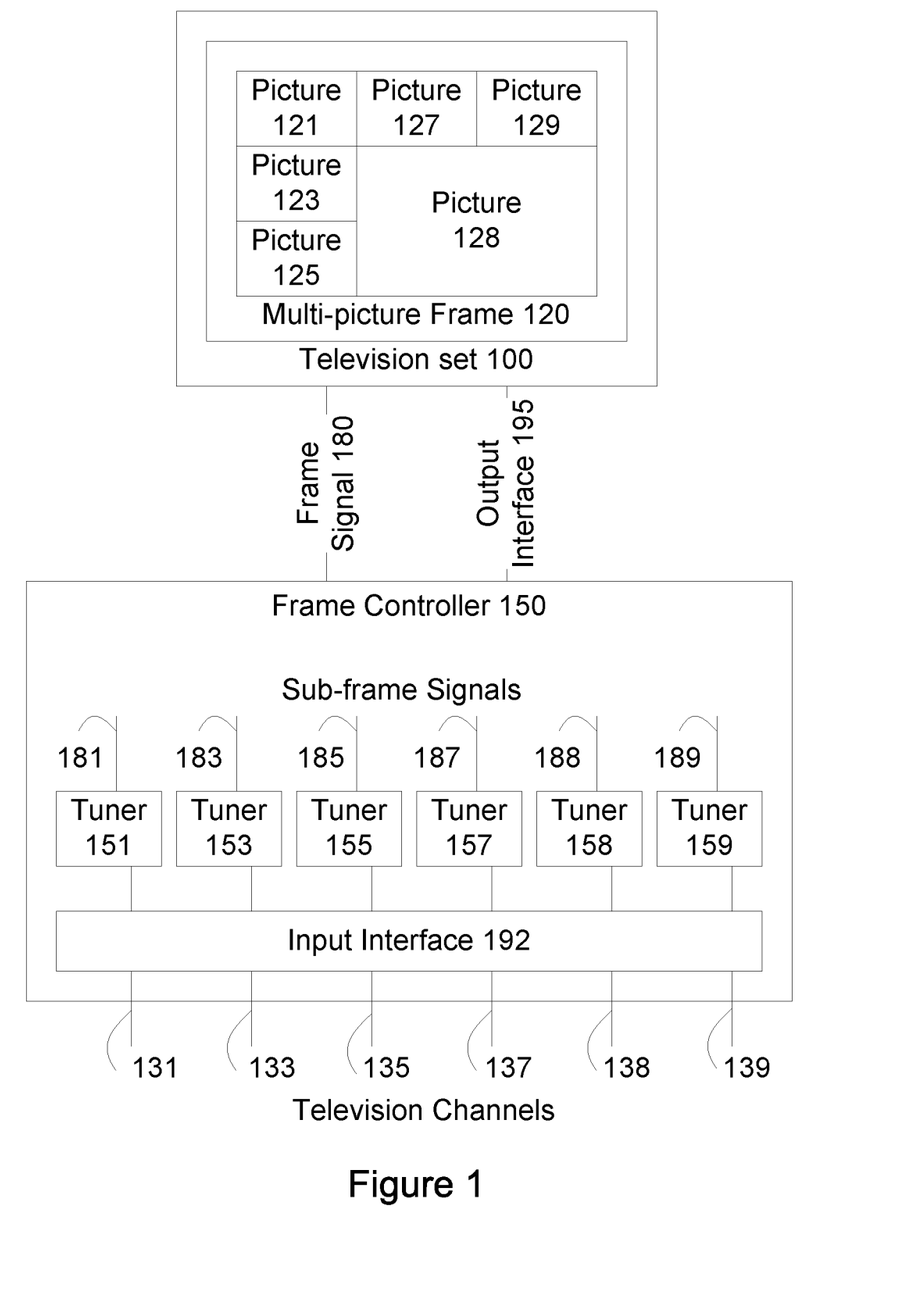
FIG. 1 is a schematic diagram illustrating a television set with a multi-picture frame.

FIG. 1 is a block diagram of a television set 100 displaying a multi-picture frame and a frame controller 150. Television set 100 is an electronic device that receives and displays images and sounds. In one embodiment, television set 100 receives images and sounds as video data or a video stream from a television channel 131, which may originate from a broadcast television network, a cable television network, a satellite television network, or Internet Protocol television (IPTV) network. Alternatively, the video data may originate from a VCR, a DVD player, a digital video recorder (DVR), a set top box, or any other video source.

In an embodiment, television set 100 includes a screen capable of displaying a multi-picture frame 120 large enough for a user to comfortably watch multiple pictures from 6 feet away. In one embodiment television set 100 has a screen size of at least 32 inches, or 80 cm. In another embodiment, a user watches television set 100 from 15 feet away, and the screen size is at least 60 inches or 150 cm.

Multi-picture frame 120 includes multiple pictures 121, 123, 125, 127, 128, 129. Picture 128 is a major picture having a display size larger than the smaller pictures 121, 123, 125, 127 and 129. Multi-picture frame 120 differs from picture-in-picture (PIP) in that a small picture does not overlay over the large picture 128 in multi-picture frame 120. Moreover, the large picture 128 does not occupy the full screen, as in a conventional PIP.

In an exemplary embodiment, television set 100 has a screen size of 32 inches diagonal, picture 128 has a size of 22 inches diagonal, and picture 121 has a size of 9 inches diagonal. In another exemplary embodiment, television set 100 has a screen size of 40 inches diagonal, picture 128 has a size of 27 inches diagonal, and picture 121 has a size of 12 inches diagonal. In still another exemplary embodiment, television set 100 has a screen size of 60 inches diagonal, picture 128 has a size of 42 inches diagonal, and picture 121 has a size of 16 inches diagonal.

In various embodiments, picture 128 may have a picture resolution and aspect ratios of NTSC standard, defined by National Television System Committee, Phase Alternating Line (PAL), DVD video, or HDTV. In one embodiment, picture 128 has a better picture resolution than NTSC, PAL or HDTV.

The layout of the multiple pictures depicted in FIG. 1 is exemplary in nature. In various embodiments the number, dimensions and positions of the various pictures or picture frames may differ. For example, in one embodiment the size of large picture 128 is as depicted, but the sizes of the small pictures are different.

Figure 1A:
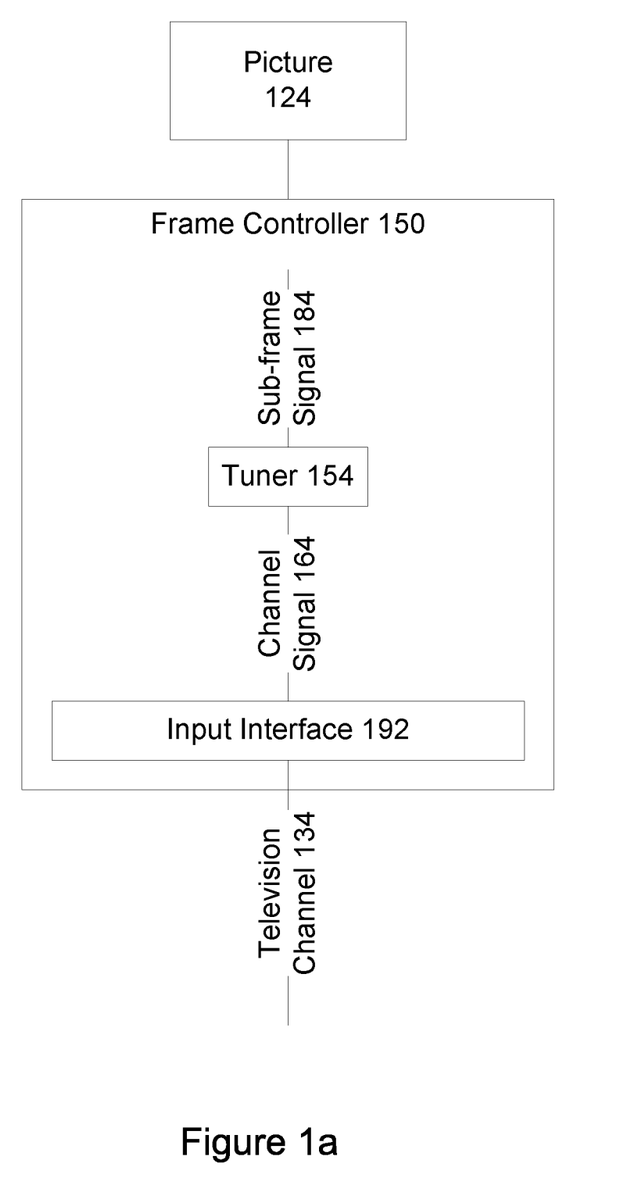
FIG. 1a is a schematic diagram illustrating a picture and a frame controller in accordance with an embodiment of the present invention.

FIG. 1a is a block diagram depicting a picture 124 and a frame controller 150. Picture 124 can be a larger picture 128 or smaller picture 127, as depicted in FIG. 1. In an embodiment, picture 124 displays images and sounds, i.e., the video signal of television channel 134. In one embodiment, picture 124 displays cable television channel 34, or video from a DVD player. Typically, different pictures such as picture 123 and picture 129 display different television channels 133 and 139. For example, in one embodiment, picture 123 displays cable television channel 34, picture 129 displays broadcast television channel 48, picture 123 displays satellite television channel 93, and picture 127 displays a movie from a VCR.

Referring once again to FIG. 1, in an embodiment of the invention, pictures 121, 123, 125, 127, 128, and 129 display television channels 131, 133, 135, 137, 138 and 139, respectively.

In one embodiment, television 120 displays the sounds of the largest picture 128 and not of other pictures. Alternatively, in another embodiment, television 120 may display the sounds of picture 129 or of another picture as selected by the user.

Frame controller 150 controls multi-picture frame 120. In an embodiment, frame controller 150 includes input interface 192 connecting to television channels 131, 133, 135, 137, 138 and 139. Input interface 192 may include any of a coaxial interface, a Radio Frequency (RF) interface, a High-Definition Multimedia interface (HDMI), a component interface such as YPbPr or YCbCr interface, a composite interface, an Ethernet interface, or a wireless network interface. Frame controller 150 receives video streams of the said television channels from the input interface 192.

Frame controller 150 connects to television set 100. In one embodiment, frame controller 150 includes an output interface 195 connecting to television set 100. Frame controller 150 sends frame signal 180 for multi-picture frame 120 over output interface 195 to television set 100. In one embodiment, output interface 195 may include an RF interface, an HDMI interface, an S-video interface, a component interface, or a composite interface. Output interface 195 may include a wireless network such as a Wireless Local Area Network (WLAN), a Worldwide Interoperability for Microwave Access (WiMax), or an Ultra-Wideband (UWB) network.

Referring back to FIG. 1a, frame controller 150 includes a tuner 154 handling a video stream or signal for picture 124. Based on television channel 134 of picture 124, tuner 154 selects television channel 134 from input interface 192, receives the video stream or signal 164 of television channel 134, transforms channel video stream or signal 164 to sub-frame signal 184.

In FIG. 1, frame controller 150 includes multiple tuners 151, 153, 155, 157, 158, 159 corresponding to multiple pictures 121, 123, 125, 127, 128, and 129, accordingly. Tuners 151, 153, 155, 157, 158 and 159 generate sub-frame signals 181, 183, 185, 187, 188 and 189. Frame controller 150 combines sub-frame signals 181, 183, 185, 187, 188 and 189 into frame signal 180, and transmits frame signal 180 over output interface 195 to television set 100. Television set 100 subsequently displays frame signal 180.

In one embodiment, television set 100 includes the frame controller 150. In such an embodiment the output interface 195 may be an internal bus or other connection within the television set 100.

Figure 2:
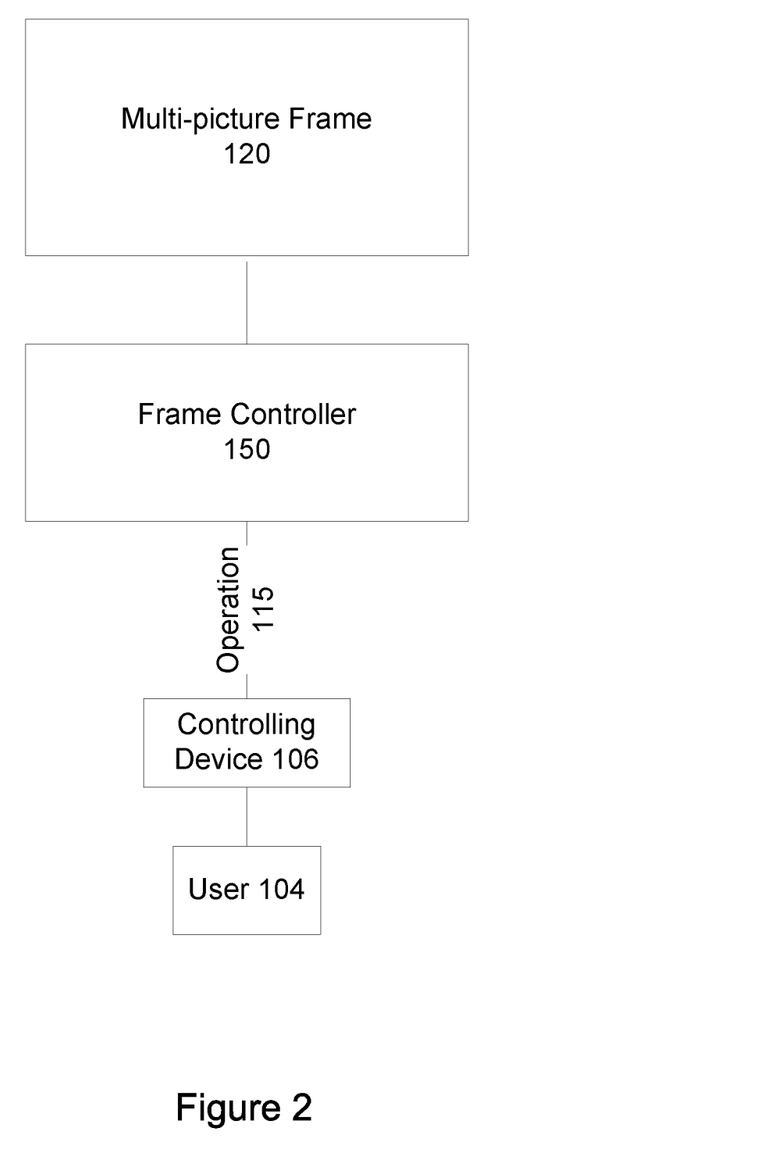
FIG. 2 is a schematic diagram illustrating controlling operations of a multi-picture frame, in accordance with an embodiment of the present invention.

FIG. 2 illustrates controlling operations of a multi-picture frame 120. In an embodiment of the invention, frame controller 150 controls operations of the multi-picture frame 120, and a user 104 uses a controlling device 106 to instruct frame controller 150. Frame controller 150 connects to the controlling device 106 through, for example infrared signals, radio signals, or a data network such as Ethernet, WLAN, or WiMax. In alternative embodiments, the controlling device 106 is a remote control, a mobile device such as a cell phone, a personal computer or a laptop.

Figure 2A:
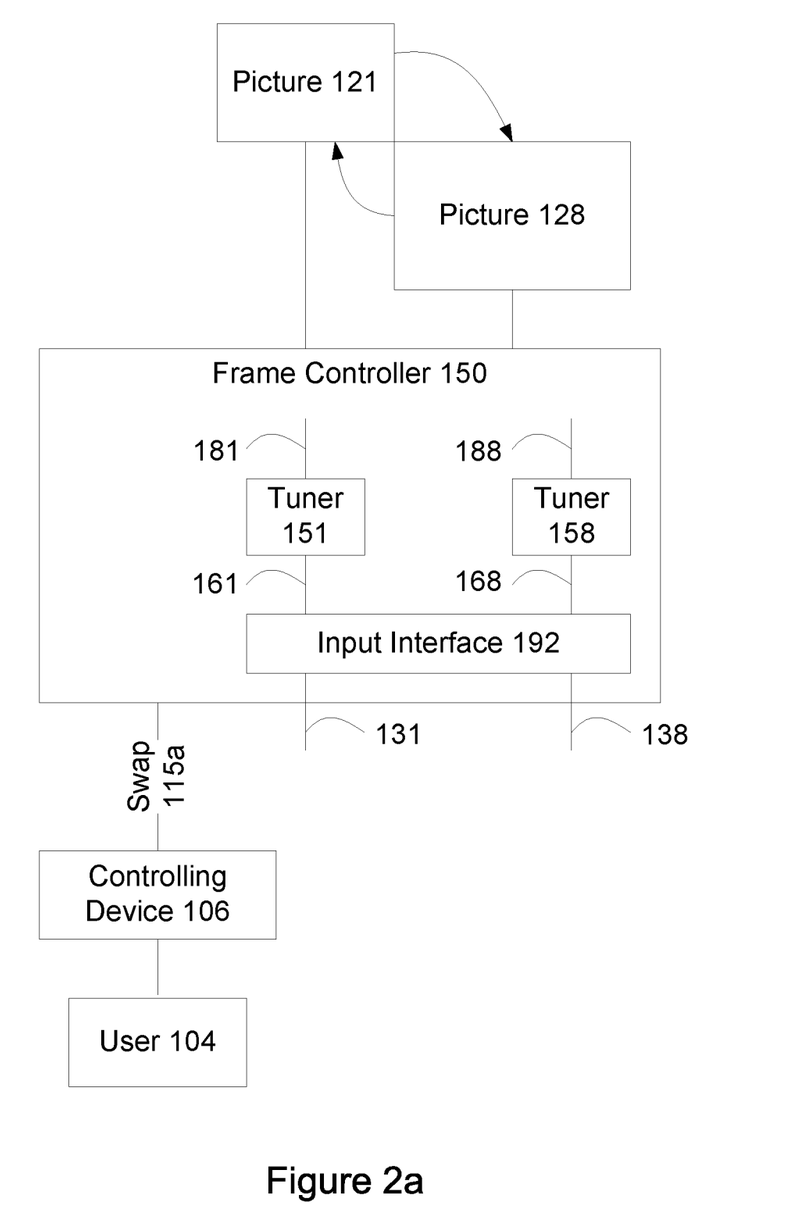
FIG. 2a is a schematic diagram depicting a process to swap the television channel of two displayed pictures, in accordance with an embodiment of the present invention.
Figure 2B:
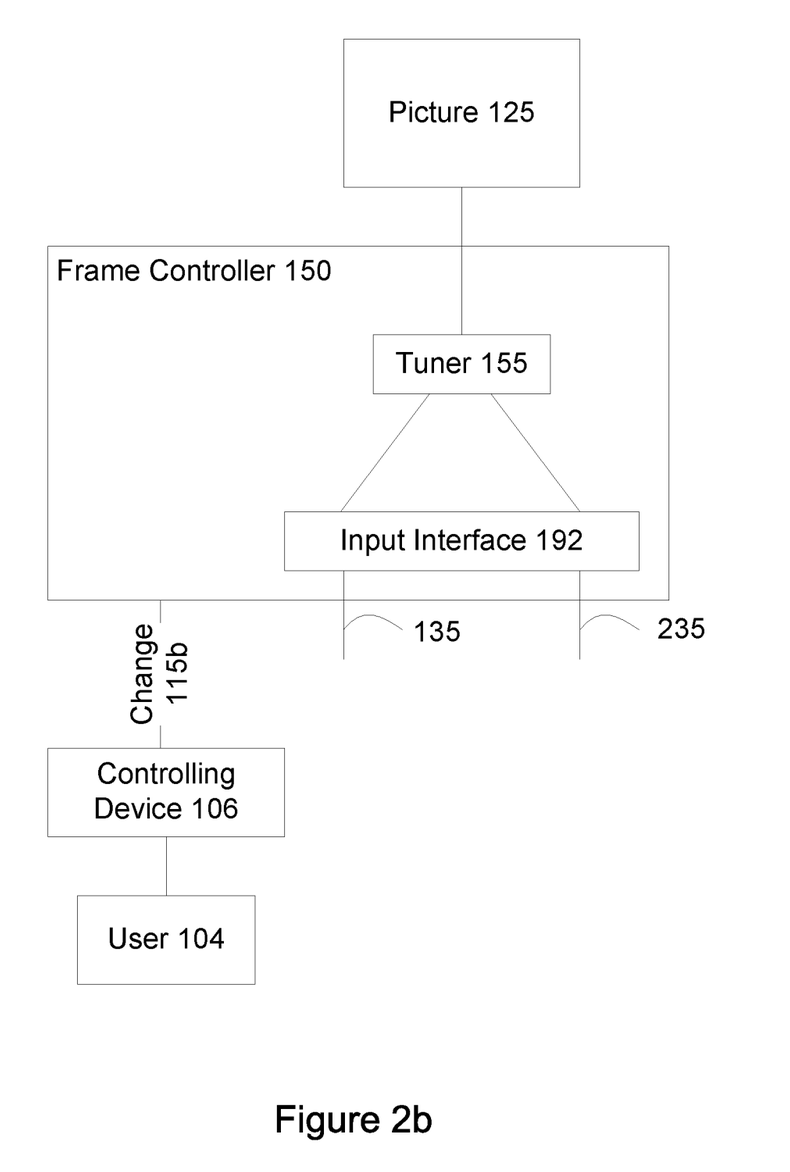
FIG. 2b is a schematic diagram depicting a process to change a television channel of a display picture, in accordance with an embodiment of the present invention.

FIGS. 2a and 2b are block diagrams illustrating picture swapping and changing operations, respectively, in an exemplary embodiment of the invention.

In FIG. 2a, frame controller 150 provides a swap operation 115a swapping picture 121 with picture 128. User 104 selects, using controlling device 106, picture 121 and picture 128. The user 104 then selects swap operation 115a. In response to receiving the swap operation 115a signal from the controlling device 106, frame controller 150 informs tuner 151 to transform channel signal 161 to sub-frame signal 181 using a large picture resolution of picture 128. Frame controller 150 informs tuner 158 to transform channel signal 168 to sub-frame signal 188 using a small picture resolution of picture 121. When frame controller 150 composes sub-frame signals 181, 183, 185, 187, 188 and 189, frame controller 150 places sub-frame signal 188 to the location of picture 121 and sub-frame signal 181 to the location of picture 128.

The replacement of picture 128 by picture 121 may be performed in several ways. In an embodiment, frame controller 150 informs tuner 158 to select television channel 131. Tuner 158 receives channel signals 168 from television channel 131, transforms channel signals 168 to sub-frame signal 188. In another embodiment, frame controller 150 informs tuner 158 not to transform channel signal 168. Frame controller 150 informs tuner 151 to transform channel signal 161 to sub-frame signal 188 using picture resolution of picture 128, in addition to sub-frame signal 181 using current small picture resolution of picture 121. Frame controller places sub-frame signal 188 to the location of picture 128.

A user 104 may swap two small pictures, such as picture 123 and picture 125, rather than swapping a small picture and a large picture.

As depicted in FIG. 2b, in an embodiment, frame controller 150 provides a change operation 115b to change a television channel of a displayed picture. In exemplary operation, a user 104 selects picture 125, which is displaying television channel 135. Next, user 104 selects the change channel operation 115b using the controlling device 106, and further selects another television channel to display. In one embodiment, the user 104 selects the new television channel directly, whereas, in an alternative embodiment, the user 104 selects the next channel in a sequence of channels, or the previous channel, or another video source altogether, such as DVD player. In one embodiment, the user 104 keys in a television channel number or name. Frame controller 150 determines television channel 235 and informs tuner 155 to switch to television channel 235.

Figure 3A:
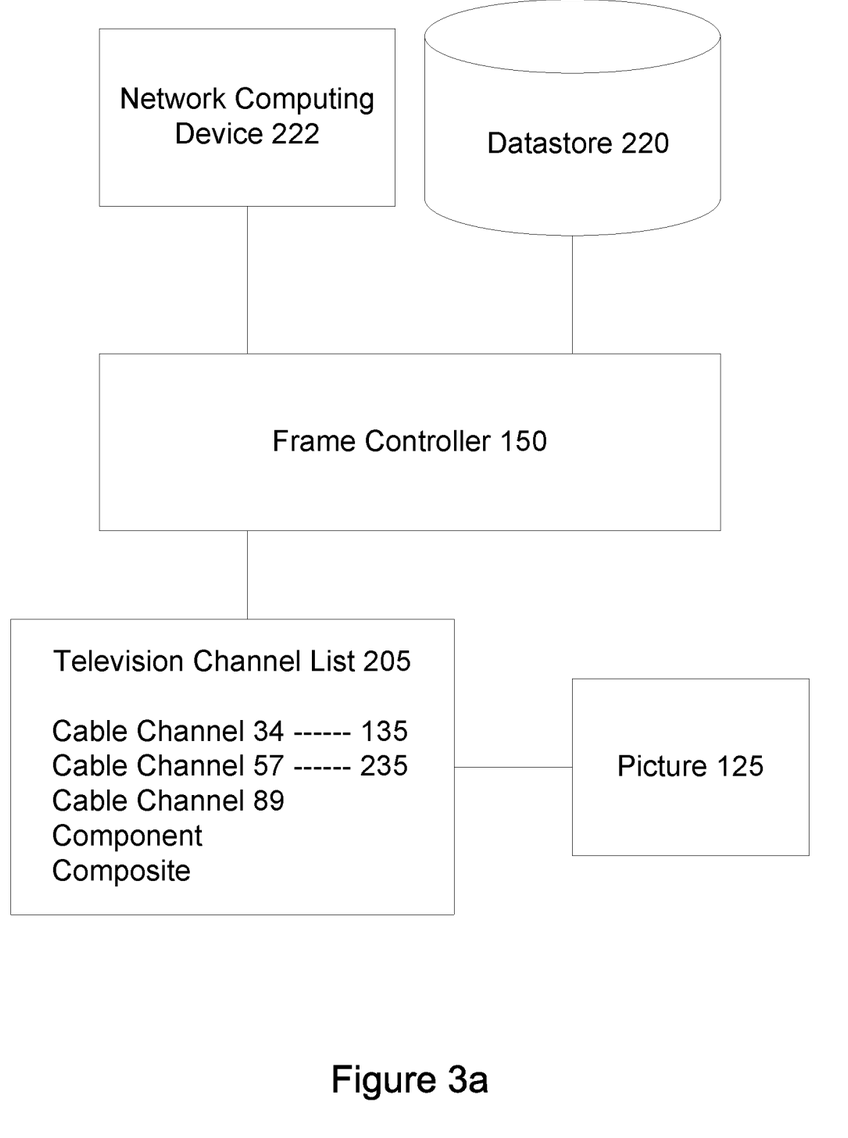
FIG. 3a is a schematic diagram depicting the use of a television channel selection list for selecting a television channel to display, in accordance with an embodiment of the present invention.
Figure 3B:
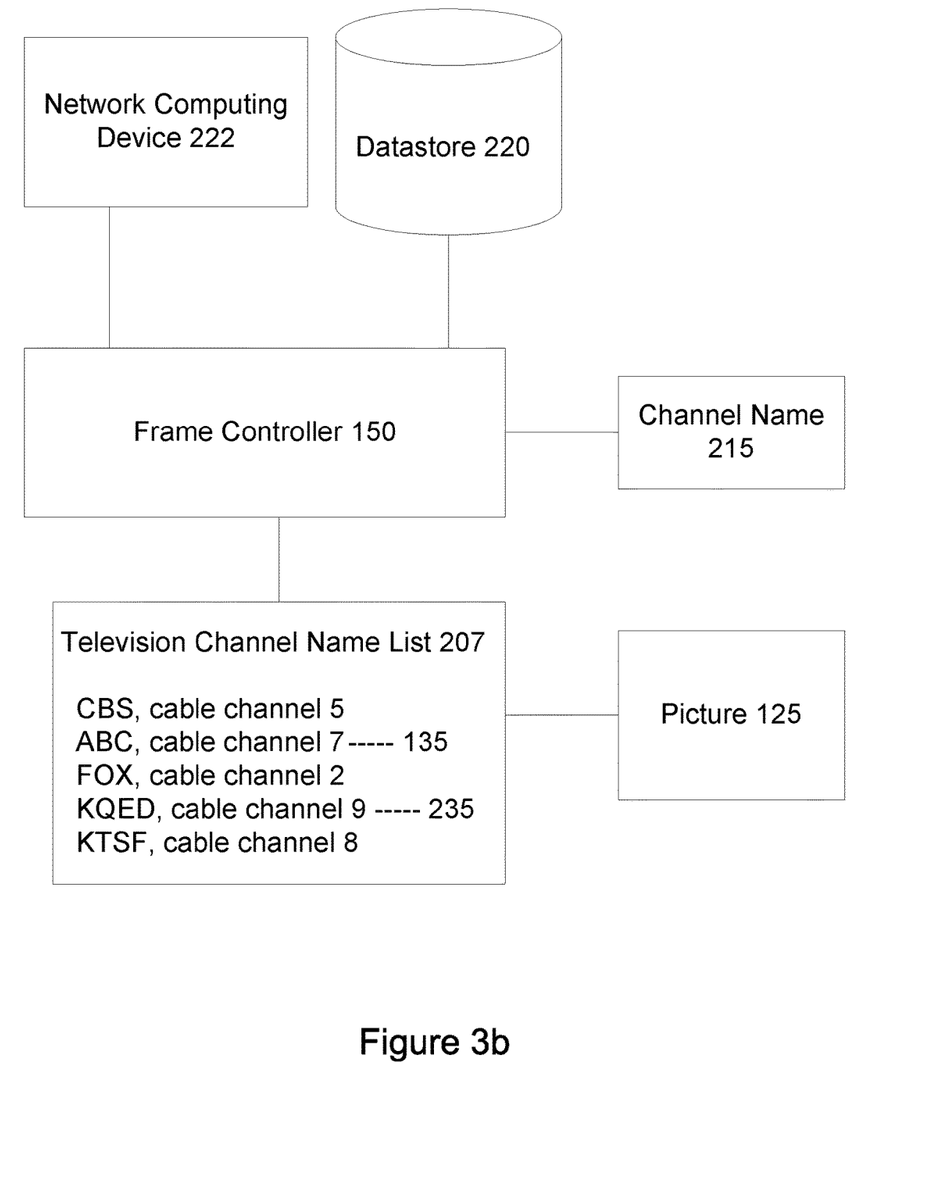
FIG. 3b is a schematic diagram depicting the use of a television channel name list for selecting a television channel to display, in accordance with an embodiment of the present invention.

FIGS. 3a and 3b illustrate the use of a television channel selection list and a television channel name list, respectively, for selecting a television channel to display.

In one embodiment, frame controller 150 determines the second television channel 235 based on picture 125. For example, picture 125 may be associated with a pre-determined television channel list 205 for picture 125. FIG. 3a illustrates television channel list 205 for picture 125. Picture 125 is currently displaying television channel 135. When the user 104 selects the next television channel, frame controller 150 determines the second television channel 235 from television channel list 205 to be cable channel 57. In another, frame controller 150 connects to a datastore 220 that includes television channel list 205. Frame controller 150 matches picture 125 against datastore 220 and retrieves television channel list 205.

In another embodiment, frame controller 150 queries a network computing device 222 that includes television channel list 205. Frame controller 150 sends picture 125 and television channel 135 to computing device 222. Frame controller 150 obtains television channel 235 from computing device 222.

In an embodiment, the user 104 specifies television channel 235 by channel name 215, as depicted in FIG. 3b. Frame controller 150 matches channel name 215 against television channel name list 207 and retrieves the corresponding television channel 235. In one embodiment, frame controller 150 connects a datastore 220 that includes television channel name list 207. Frame controller 150 matches picture 125 against datastore 220 and retrieves television channel name list 207.

In another embodiment, frame controller 150 queries a network computing device 222 that includes television channel name list 207. Frame controller 150 sends picture 125 and channel name 215 to computing device 222. Frame controller 150 obtains television channel 235 from computing device 222.

Numerous other operations may be performed by the frame controller 150 as directed by a user 104. For example, operation 115 can be used to increase or reduce the size of picture 128. In one embodiment, operation 115 can be to swap the picture whose sounds are audible between picture 123 and picture 128. In another embodiment, frame controller 150 connects to a recorder such as a DVD recorder, and operation 115 can be used to record television channel 135 of picture 125. In yet another embodiment, operation 115 can be used to restart a television program of television channel 137 of picture 127, or to pause, fast forward or fast backward television channel 137 of picture 127.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:
1. A device comprising:
an input interface configured to receive a plurality of video streams and to provide the plurality of video streams to a frame controller, wherein each video stream of the plurality of video streams corresponds to a video channel of a plurality of video channels;
the frame controller configured to generate a first frame signal including:
a first subframe signal corresponding to a first video stream of the plurality of video streams;
a second subframe signal corresponding to a second video stream of the plurality of video streams; and
a third subframe signal corresponding to a third video stream of the plurality of video streams;
an output interface configured to output the first frame signal to a display, wherein the first frame signal is configured to cause the display to simultaneously display first video corresponding to the first video stream in a first portion of the display, second video corresponding to the second video stream in a second portion of the display, and third video corresponding to the third video stream in a third portion of the display and to output first audio corresponding to the first video stream, wherein the first portion, the second portion, and the third portion of the display are non-overlapping, and wherein the first portion is larger than the second portion;
the frame controller further configured to generate a second frame signal responsive to receiving a swap command, the second frame signal including:
a fourth subframe signal corresponding to the first video stream of the plurality of video streams;
a fifth subframe signal corresponding to the second video stream of the plurality of video streams; and
a sixth subframe signal corresponding to the third video stream of the plurality of video streams; and
the output interface further configured to output the second frame signal to the display, wherein the second frame signal is configured to cause the display to simultaneously display video corresponding to the second video stream in the first portion of the display, video corresponding to the first video stream in the second portion of the display, and video corresponding to the third video stream in the third portion of the display and to output second audio corresponding to the second video stream.

2. The device of claim 1, the frame controller including a plurality of tuners, each tuner configured to generate a subframe signal.

3. The device of claim 1, wherein the input interface is configured to receive the plurality of video streams via a coaxial cable.

4. The device of claim 1, wherein the input interface is configured to receive the plurality of video streams via an Ethernet cable.

5. The device of claim 1, wherein the input interface is configured to receive at least one video stream of the plurality of video streams via a coaxial cable.

6. The device of claim 5, wherein the input interface is configured to receive another video stream of the plurality of video streams via a component cable, a composite cable, a high-definition multimedia interface (HDMI) cable, or via an Internet connection.

7. The device of claim 1, wherein the input interface comprises a wireless interface configured to receive the plurality of video streams wirelessly.

8. The device of claim 1, wherein the first frame signal is further configured cause the display to display each subframe in a corresponding area of the display separate from an area occupied by any other subframe.

9. The device of claim 1, the frame controller further configured to generate a third frame signal responsive to a channel change command, the third frame signal comprising:
a seventh subframe signal corresponding to a fourth video stream of the plurality of video streams;
a eight subframe signal corresponding to the second video stream of the plurality of video streams; and
a ninth subframe signal corresponding to the third video stream of the plurality of video streams, wherein the third frame signal is configured to cause the display to simultaneously display video corresponding to the second video stream in the first portion of the display, video corresponding to the fourth video stream in the second portion of the display, and video corresponding to the third video stream in the third portion of the display and to output third audio corresponding to the fourth video stream.

10. The device of claim 1, the frame controller further configured to generate a third frame signal responsive to a channel change command, the third frame signal comprising:
a seventh subframe signal corresponding to the first video stream of the plurality of video streams;
a eight subframe signal corresponding to a fourth video stream of the plurality of video streams; and
a ninth subframe signal corresponding to the third video stream of the plurality of video streams, wherein the third frame signal is configured to cause the display to simultaneously display video corresponding to the fourth video stream in the first portion of the display, video corresponding to the first video stream in the second portion of the display, and video corresponding to the third video stream in the third portion of the display and to output third audio corresponding to the fourth video stream.

11. The device of claim 1, the frame controller further configured to generate a third frame signal responsive to a pause command, the third frame signal comprising:
a seventh subframe signal corresponding to the first video stream of the plurality of video streams, wherein the seventh subframe contains the same video data as the fourth subframe signal;
an eight subframe signal corresponding to the second video stream of the plurality of video streams; and
a ninth subframe signal corresponding to the third video stream of the plurality of video streams, wherein the third frame signal is configured to cause the display to simultaneously display video corresponding to the second video stream in the first portion of the display, video corresponding to the first video stream in the second portion of the display, and video corresponding to the third video stream in the third portion of the display and to output third audio corresponding to the second video stream.

12. The device of claim 1, further comprising a memory configured to store video data of at least one video stream of the plurality of video streams responsive to receiving a record command.

13. The device of claim 1, the frame controller further configured to adjust a size of at least one of the subframes of a third frame signal responsive to one or more inputs.

14. The device of claim 1, wherein a first aspect ratio of the first video comprises a 16×9 aspect ratio.

15. The device of claim 14, wherein the first aspect ratio of the first video is the same as an input aspect ratio of the first video stream.

16. The device of claim 1, further comprising display, wherein the output interface corresponds to an internal bus of the display.

17. The device of claim 16, wherein the display corresponds to a television.

18. The device of claim 16, wherein the display corresponds to a mobile display device.

19. A method comprising:
receiving a plurality of video streams and to provide the plurality of video streams to a frame controller, wherein each video stream of the plurality of video streams corresponds to a video channel of a plurality of video channels;
generate a first frame signal including:
a first subframe signal corresponding to a first video stream of the plurality of video streams;
a second subframe signal corresponding to a second video stream of the plurality of video streams; and
a third subframe signal corresponding to a third video stream of the plurality of video streams;
outputting the first frame signal to a display, wherein the first frame signal is configured to cause the display to simultaneously display first video corresponding to the first video stream in a first portion of the display, second video corresponding to the second video stream in a second portion of the display, and third video corresponding to the third video stream in a third portion of the display and to output first audio corresponding to the first video stream, wherein the first portion, the second portion, and the third portion of the display are non-overlapping, and wherein the first portion is larger than the second portion;
generating a second frame signal responsive to receiving a swap command, the second frame signal including:
a fourth subframe signal corresponding to the first video stream of the plurality of video streams;
a fifth subframe signal corresponding to the second video stream of the plurality of video streams; and a sixth subframe signal corresponding to the third video stream of the plurality of video streams; and outputting the second frame signal to the display, wherein the second frame signal is configured to cause the display to simultaneously display video corresponding to the second video stream in the first portion of the display, video corresponding to the first video stream in the second portion of the display, and video corresponding to the third video stream in the third portion of the display and to output second audio corresponding to the second video stream.

20. The method of claim 19, further comprising outputting a third frame signal to the display responsive to a sound swap command, wherein the third frame signal is configured to cause the display to simultaneously display video corresponding to the second video stream in the first portion of the display, video corresponding to the first video stream in the second portion of the display, and video corresponding to the third video stream in the third portion of the display and to output third audio corresponding to the first video stream.

* * * * *